(12) United States Patent
Faulkner et al.

(10) Patent No.: US 11,145,441 B2
(45) Date of Patent: Oct. 12, 2021

(54) ELECTRICAL ISOLATOR

(71) Applicant: CROMPTON TECHNOLOGY GROUP, LTD., Solihull (GB)

(72) Inventors: Dale V. L. Faulkner, Stourbridge (GB); Alexander Douglas Taylor, Exeter (GB)

(73) Assignee: CROMPTON TECHNOLOGY GROUP, LTD., Solihull (GB)

( * ) Notice: Subject to any disclaimer, the term of this patent is extended or adjusted under 35 U.S.C. 154(b) by 75 days.

(21) Appl. No.: 16/713,589

(22) Filed: Dec. 13, 2019

(65) Prior Publication Data
US 2020/0321146 A1    Oct. 8, 2020

(30) Foreign Application Priority Data

Apr. 2, 2019   (EP) ..................................... 19275039

(51) Int. Cl.
    *H01B 17/56*    (2006.01)
    *F16L 25/02*    (2006.01)
    *H01B 19/00*    (2006.01)

(52) U.S. Cl.
    CPC .............. *H01B 17/56* (2013.01); *F16L 25/02* (2013.01); *H01B 19/00* (2013.01)

(58) Field of Classification Search
    CPC ........ H01B 17/56; H01B 19/00; H01B 17/30; H01B 17/301; F16L 25/02; F16L 25/00; F16L 13/11; F16L 25/01; F16L 25/03; F16L 58/18; F16L 25/12; B64D 45/02
    USPC ....... 174/138 R, 68.1, 68.3, 137 R; 138/111, 138/112, 118, 155, 156, 120; 285/53, 285/285.1, 294.1, 417
See application file for complete search history.

(56) References Cited

U.S. PATENT DOCUMENTS

| | | | | |
|---|---|---|---|---|
| 3,462,175 A | * | 8/1969 | Johnson | F16L 21/005 285/53 |
| 3,705,735 A | * | 12/1972 | Davidson | F16L 25/023 285/53 |
| 3,993,331 A | * | 11/1976 | Schwarz | F16L 21/022 285/53 |
| 4,398,754 A | | 8/1983 | Caroleo et al. | |

(Continued)

FOREIGN PATENT DOCUMENTS

FR      2359357 A1    2/1978

OTHER PUBLICATIONS

The Extended European Search Report for Application No. 19275039.6-1010; Report dated Sep. 30, 2019; Report Received Date: Oct. 3, 2019; 10 pages.

*Primary Examiner* — Angel R Estrada
(74) *Attorney, Agent, or Firm* — Cantor Colburn LLP

(57) ABSTRACT

An electrical isolator includes comprising: a first fluid-carrying member a second fluid-carrying member spaced apart from the first fluid-carrying member to form a gap; a resistive, semi-conductive or non-conductive component extending across the gap and bonded to the first and second fluid-carrying members so as to provide a fluid tight seal between the first fluid-carrying member and the resistive, semi-conductive or non-conductive component and between the second fluid-carrying member and the resistive, semi-conductive or non-conductive component. The isolator also includes a reinforcing composite encircling the first fluid-carrying member, the second fluid-carrying member and the resistive, semi-conductive or non-conductive component.

14 Claims, 3 Drawing Sheets

(56) References Cited

U.S. PATENT DOCUMENTS

| | | | |
|---|---|---|---|
| 4,461,736 A * | 7/1984 | Takagi | B29C 44/12 |
| | | | 156/48 |
| 4,630,846 A * | 12/1986 | Nishino | B29C 37/0082 |
| | | | 285/21.1 |
| 4,654,747 A * | 3/1987 | Covey | F16L 25/03 |
| | | | 361/215 |
| 5,092,632 A * | 3/1992 | Washizu | B29C 45/14614 |
| | | | 285/294.1 |
| 5,131,688 A | 7/1992 | Tricini | |
| 8,248,748 B2 | 8/2012 | Ciolczk et al. | |
| 8,956,556 B2 * | 2/2015 | Breay | B64D 45/02 |
| | | | 252/502 |
| 9,019,683 B2 | 4/2015 | Day et al. | |
| 10,112,724 B2 | 10/2018 | Rorabaugh et al. | |
| 10,361,017 B2 * | 7/2019 | Chase | H01B 17/34 |
| 2017/0103832 A1 | 4/2017 | Chase et al. | |

* cited by examiner

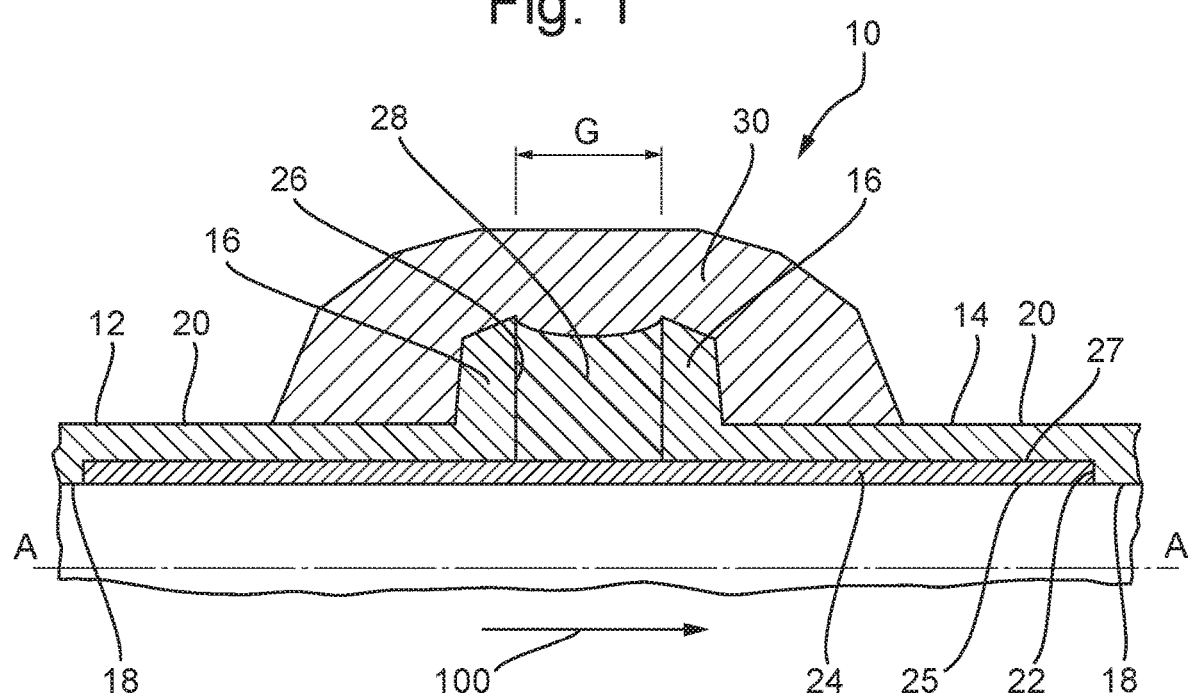
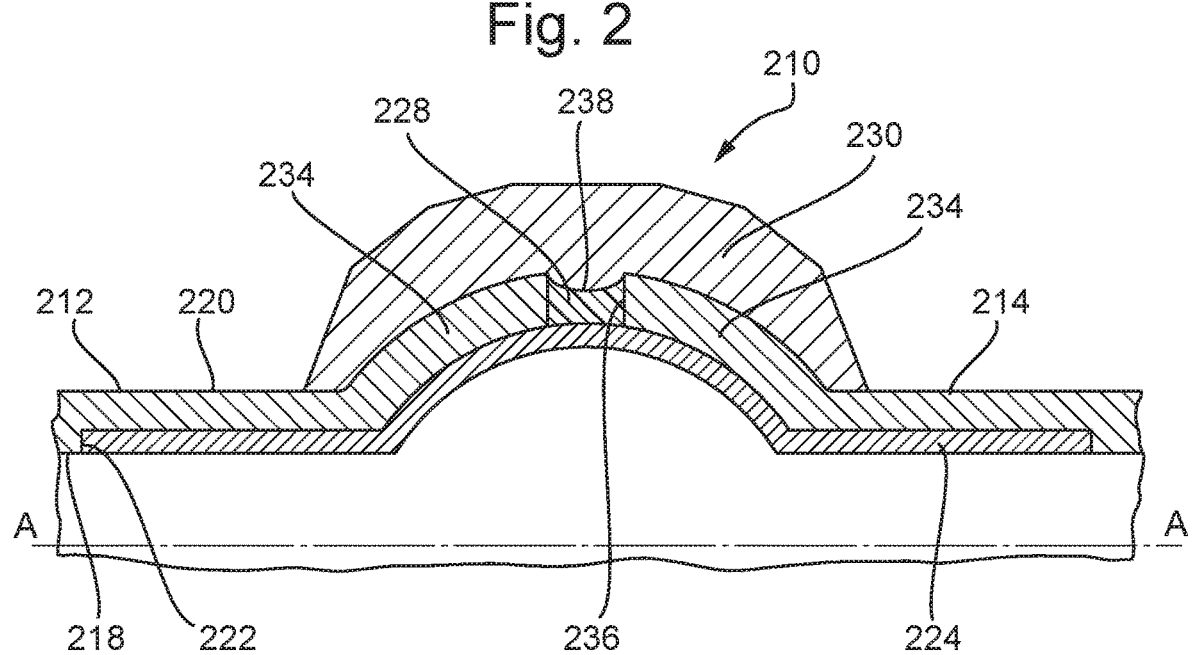

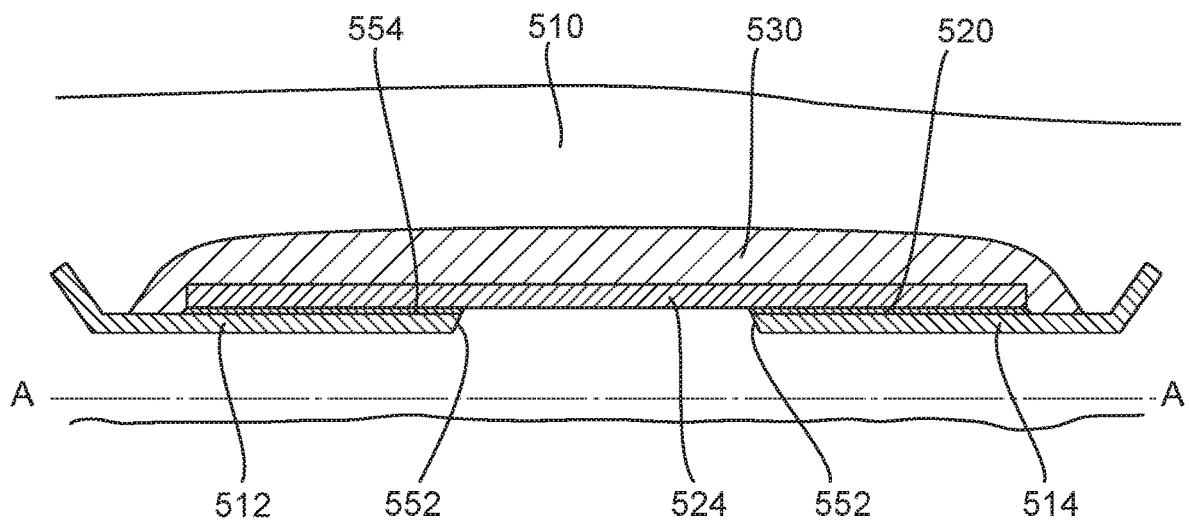
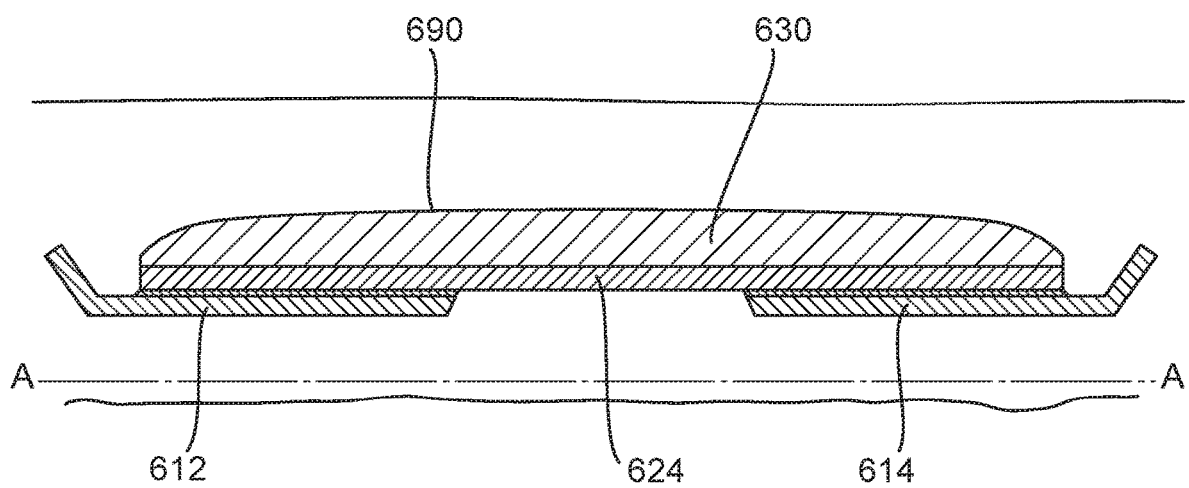

ELECTRICAL ISOLATOR

FOREIGN PRIORITY

This application claims priority to European Patent Application No. 19275039.6 filed Apr. 2, 2019, the entire contents of which is incorporated herein by reference.

FIELD

The present disclosure relates generally to an electrical isolator, and more specifically to an electrical isolator for use in a hydraulic fluid line or fuel line of a vehicle or machine such as an aircraft. The electrical isolator may be used for connecting two fluid-carrying members such as pipes, hoses or tubes, for example pipes conveying hydraulic fluid or fuel.

BACKGROUND

Aircraft and other vehicles contain a large number of fluid conveying systems, in particular hydraulic and fuel systems that comprise fluid conveying components such as pipes. Such components are typically metallic or a composite material and have good electrical conductivity.

Devices are incorporated into such systems to form electrical isolators between the metallic components thereof. These isolators prevent build-up of electrostatic charge by safely dissipating static build up, and also prevent excessive electrical current flowing through the system, for example due to a lightning strike. Both of these events may cause a fire hazard if such isolators were not present in the system.

When incorporated into a fluid conveying system, the electrical isolator also needs to act as a safe passage for fluid. In certain systems, for example hydraulic systems or hydraulic fluid lines in an aircraft, the isolator needs to be able to withstand high pressures, in addition to other load and environmental factors.

The present disclosure is aimed at balancing the above factors to provide an electrical isolation function within a pressurised fluid system.

When used in aircraft in particular although not exclusively, it is also desirable to make the electrical isolator as small and as light weight as possible.

US 2017/0103832 A1 discloses an electrical isolator for use in a fluid conveying system. The electrical isolator comprises a first fluid-carrying member and a second fluid-carrying member spaced apart from the first fluid-carrying member; a resistive, semi-conductive or non-conductive component located between and sealed against the first and second fluid-carrying member, wherein the resistive, semi-conductive or non-conductive component is adapted to convey fluid flowing from the first fluid-carrying member to the second fluid-carrying member; a reinforcing composite encircling the first fluid-carrying member, the second fluid-carrying member and the resistive, semi-conductive or non-conductive component, wherein the reinforcing composite is continuous and may provide a conductive path between the first fluid-carrying member and the second fluid-carrying member, wherein the reinforcing composite comprises fibre and a resin mixture, and the resin mixture comprises resin and a conductive additive. O-ring seals provided in grooves machined into the first and second fluid-carrying members are used to seal the resistive, semi-conductive or non-conductive component to the first and second fluid-carrying members.

In a typical electrical isolator, costly multipart unidirectional seals are used to provide a seal between the fluid-carrying members and the resistive, semi-conductive or non-conductive component or liner.

SUMMARY

In accordance with an aspect of the disclosure, there is provided an electrical isolator. The isolator includes a first fluid-carrying member and a second fluid-carrying member spaced apart from the first fluid-carrying member to form a gap. The isolator also includes a resistive, semi-conductive or non-conductive component extending across the gap and bonded to the first and second fluid-carrying members so as to provide a fluid tight seal between the first fluid-carrying member and the resistive, semi-conductive or non-conductive component and between the second fluid-carrying member and the resistive, semi-conductive or non-conductive component and a reinforcing composite encircling the first fluid-carrying member, the second fluid-carrying member and the resistive, semi-conductive or non-conductive component.

The above isolator uses a bond between the resistive, semi-conductive or non-conductive component and the first and second fluid-carrying members thereof to provide a fluid tight seal between the first fluid-carrying member and the resistive, semi-conductive or non-conductive component and between the second fluid-carrying member and the resistive, semi-conductive or non-conductive component so that in use, fluid may flow from the first fluid-carrying member to the second fluid-carrying member without leaking. In the isolator according to the disclosure, there is therefore no need to provide separate sealing members such as the traditional hydraulic seals used in known electrical isolators which require grooves to be machined into parts of the electrical isolator and which are typically expensive and time consuming to assemble. Further, the traditional hydraulic seals can sometimes be incorrectly fitted causing leaks which can only be detected after the isolator has been fully assembled, the reinforcing composite has been cured and the isolator is tested.

In addition to the above, as the resistive, semi-conductive or non-conductive component is bonded to the first and second fluid-carrying members in the electrical isolator according to the disclosure, the resistive, semi-conductive or non-conductive component and the first and second fluid-carrying members are fixed in place relative to each other such that no additional means are required to hold the resistive, semi-conductive or non-conductive component and the first and second fluid-carrying members in position while the reinforcing composite is being formed.

In addition to the above, in prior art arrangements using seals such as O-rings, internal fluid pressure in an electrical isolator may force the seal through a small gap, potentially causing the seal to be permanently deformed or extruded and so to fail. The seal provided by the bond of the isolator according to the disclosure can help to reduce deformation or extrusion of the seal by mechanically supporting some contact surfaces of the seal. By bonding to the resistive, semi-conductive or non-conductive component and the first and second fluid-carrying members, relative movement between the bond and the resistive, semi-conductive or non-conductive component and the first and second fluid-carrying members is reduced such that deformation or extrusion of the seal provided by the bond is less likely to occur.

In addition to the above, the electrical isolator according to the disclosure enables an electrical isolator which is fluid tight at the required pressures to be provided in a shorter axial length than has been previously possible. The electrical isolator of the disclosure is also lighter and less expensive to produce than known electrical isolators using traditional hydraulic seals.

In addition to the above, the electrical isolator of the disclosure uses a reinforcing composite encircling the first fluid-carrying member, the second fluid-carrying member and the resistive, semi-conductive or non-conductive component, whilst providing a conductive path through the reinforcing composite, but not the gap between the first and second fluid-carrying members. This provides a device that effectively dissipates charge build-up and electrically isolates the junction between two fluid-conveying devices, whilst providing a fluid-tight joint.

The reinforcing composite encircles the first and second fluid-carrying members, but typically just the end portions thereof, e.g. closest to the resistive, semi-conductive or non-conductive component. The reinforcing composite may be a continuous tube that extends from the first fluid-carrying member (or an end portion thereof) and over the gap to the second fluid-carrying member (or an end portion thereof).

In any aspect of the disclosure, a material may be provided in the gap between the first and second fluid-carrying members and may be bonded to the resistive, semi-conductive or non-conductive component, and the first and second fluid-carrying members. The material may be bonded to the first and second fluid-carrying members and the resistive, semi-conductive or non-conductive component using an adhesive.

The material may have a low conductivity such that the material acts as an electrical isolator between the first and second fluid-carrying members.

Further, the material may act to minimise relative movement of the respective parts of the electrical isolator under pressure.

In any aspect of the disclosure, the material may be an elastomer, and more preferably the material may be a fluoro elastomer.

In any aspect of the disclosure, the first fluid-carrying member may terminate in a first flange extending radially outwardly therefrom, and the second fluid-carrying member may terminate in a second flange extending radially outwardly therefrom and the material may extend between the first flange and the second flange. The first and second flanges may provide a larger radial extent to support the material on either side thereof such that a greater volume of material may be provided between the first and second fluid-carrying members than would otherwise be possible.

In any aspect of the disclosure, the resistive, semi-conductive or non-conductive component may be bonded to the first and second fluid-carrying members by a bonding material provided between the resistive, semi-conductive or non-conductive component and the first fluid-carrying member and between the resistive, semi-conductive or non-conductive component and the second fluid-carrying member. In this example, a seal may be provided by the bonding material extending over part or the full extent of mating surfaces of the resistive, semi-conductive or non-conductive component and the respective first and second fluid-carrying members.

In any aspect of the disclosure, the bonding material may be flexible so as to accommodate relative movement between the resistive, semi-conductive or non-conductive component and the first and second fluid-carrying members, for example due to different rates of thermal expansion and contraction thereof. The provision of a flexible bonding material may prevent delamination and increase the fatigue life of an isolator according to the disclosure.

In any aspect of the disclosure, the bonding material may comprise an adhesive, preferably a fuel resistant adhesive, or a flexible adhesive or a fuel resistant, flexible adhesive.

In any aspect of the disclosure, the bonding material may comprise a sealant material or an injection moulded elastomeric material.

In any aspect of the disclosure, the resistive, semi conductive or non conductive component may comprise an annular liner extending coaxially with the first and second fluid-carrying members.

In any aspect of the disclosure, a first cut-out portion may be formed in the first fluid-carrying member, a second cut-out portion may be formed in the second fluid-carrying member, and the annular liner may be received in the first and second cut-out portions so that the radially inner surface of the annular liner is substantially flush with the radially inner surface of the first fluid-carrying member and the second fluid-carrying member. By making the radially inner surface of the annular liner substantially flush with the radially inner surface of the first fluid-carrying member and the second fluid-carrying member, the flow of fluid through the electrical isolator in use may be optimised.

In any aspect of the disclosure, the reinforcing composite may comprise: a layer of circumferentially wound fibre-reinforced polymer extending circumferentially around the first fluid-carrying member, the second fluid-carrying member and the resistive, semi-conductive or non-conductive component; and a layer of helical wound fibre-reinforced polymer extending helically around the first fluid-carrying member, the second fluid-carrying member and the resistive, semi-conductive or non-conductive component.

The layer of circumferentially wound fibre (also referred to as "hoop" fibre) provides additional pressure resistance to the electrical isolator. Hoop fibre is wound with a high angle to the axis of the structure such that it is wound in a very tight helix (or in some cases, even wound directly over itself, i.e. at ninety degrees to the axis). As such, hoop fibre cannot expand under radial pressure and is therefore strong against radial loads, i.e. it is pressure resistant. Such an electrical isolator with a layer of hoop fibre is better adapted to the high pressures of hydraulic systems.

While circumferential fibre is well-suited to providing pressure resistance, it is not well-suited to holding the electrical isolator together as it does not provide much strength in the axial direction. However, the layer of helical wound fibre (which may be provided radially outwardly of the circumferential fibre in one example) does provide axial strength.

Circumferential fibre here means fibre with a high winding angle (the angle that the fibre makes with the axis of the part (usually mounted on a mandrel) during winding), typically from 80 degrees up to 90 degrees, more preferably at least 85 degrees.

Helical fibre here means fibre with a low winding angle, typically between 30 degrees and 70 degrees. It is often difficult to wind fibre at angles below about 30 degrees, while angles above 70 degrees do not provide the required axial strength. Lower angles are however still viable, down to essentially 0 degrees if fibre placement can be achieved. Even true axial fibre can be used instead of helical fibre (i.e.

fibre with an angle of 0 degrees to the axis, i.e. parallel to the axis), but placement of such fibre is difficult.

In some aspects of the disclosure, the first and second fluid-carrying members and the resistive, semi conductive or non-conductive component may comprise cylindrical components having a constant cross section along the axial extent thereof. The shape of the first and second fluid-carrying members and the resistive, semi conductive or non-conductive component may however be altered to optimise the weight of the electrical isolator in view of the internal stresses applied to it in use. In any aspect of the disclosure therefore, each of the first fluid-carrying member and the second fluid-carrying member may comprise a curved portion, such that the curved portions of the first and second fluid carrying members form a substantially ovoid shape or a bulge extending radially outwardly from the first and second fluid carrying members.

In any aspect of the disclosure, the gap may be located at the radially outermost portion of the ovoid shape or bulge.

In any aspect of the disclosure, the resistive, semi conductive or non conductive component may be shaped so as to follow the shape of the first and second fluid-carrying members.

In some examples of the disclosure as discussed above, electrical isolation between the first a second fluid-carrying members may be provided by an elastomer. In an alternative example, the resistive, semi conductive or non-conductive component may further comprise a radial protrusion extending radially outwardly therefrom into the gap. Thus, the radial protrusion may provide electrical isolation between the first and second fluid-carrying members.

In another alternative example, a composite material having a low conductivity may be provided in the gap extending between the first and second fluid-carrying members. The composite material may act to provide electrical isolation between the first and second fluid-carrying members and to resist movement between them.

In another alternative example, the resistive, semi conductive or non conductive component may extend radially externally of the first and second fluid-carrying members such that no isolating material is provided in the gap extending between the first and second fluid-carrying members.

From a further aspect of the disclosure, a hydraulic or fuel system comprising an electrical isolator of any of the above examples is provided.

From a still further aspect of the disclosure, a method of making an electrical isolator is provided, the method comprising: bonding a first fluid-carrying member and a second fluid-carrying member to a resistive, semi-conductive or non-conductive component extending across a gap between the first fluid-carrying member and the second fluid-carrying member so as to provide a fluid tight seal between the first fluid-carrying member and the resistive, semi-conductive or non-conductive component and between the second fluid-carrying member and the resistive, semi-conductive or non-conductive component; and forming a reinforcing composite encircling the first fluid-carrying member, the second fluid-carrying member and the resistive, semi-conductive or non-conductive component.

Using the method of the disclosure provides a simple and cost effective method of making an electrical isolator. As the first fluid-carrying member and the second fluid-carrying member are bonded into position relative to the resistive, semi-conductive or non-conductive component prior to forming the reinforcing composite, there is no need to use an external compressive force or other means to hold the parts of the electrical isolator in place while forming the reinforcing composite. In contrast, in a prior art isolator using hydraulic seals, a compressive force is required to hold the parts of the isolator in place until after the reinforcing composite is fully formed.

In addition, the method of bonding the first fluid-carrying member and the second fluid-carrying member to the resistive, semi-conductive or non-conductive component provides a simpler, less expensive and less time consuming method of forming a seal between the components than in the prior art isolators using hydraulic seals.

In any aspect of the method of the disclosure, forming the reinforcing composite may comprise: winding fibre-reinforced polymer around the first fluid-carrying member, the second fluid-carrying member and the resistive, semi-conductive or non-conductive component; before during or after the winding fibre-reinforced polymer, providing a resin mixture so as to form a fibre-reinforced polymer and resin mixture extending around the first fluid-carrying member, the second fluid-carrying member and the resistive, semi-conductive or non-conductive component; and curing the fibre-reinforced polymer and resin mixture.

In the method of the disclosure, as a seal is provided by the bond between the first fluid-carrying member and the resistive, semi-conductive or non-conductive component and the second fluid-carrying member and the resistive, semi-conductive or non-conductive component, resin may not leak from the reinforcing composite provided radially externally of the first and second fluid-carrying members into the first and second fluid-carrying members prior to the curing step. Thus, there is no need to provide separate environmental seals between the first fluid-carrying member and the resistive, semi-conductive or non-conductive component and the second fluid-carrying member and the resistive, semi-conductive or non-conductive component as in known electrical isolators using hydraulic seals.

In any aspect of the method of the disclosure, the winding fibre-reinforced polymer around the first fluid-carrying member, the second fluid-carrying member and the resistive, semi-conductive or non-conductive component may comprise: winding circumferentially wound fibre-reinforced polymer circumferentially around the first fluid-carrying member, the second fluid-carrying member and the resistive, semi-conductive or non-conductive component; and winding helical wound fibre-reinforced polymer extending helically around the first fluid-carrying member, the second fluid-carrying member and the resistive, semi-conductive or non-conductive component.

It will be understood that the circumferentially wound fibre-reinforced polymer and the helical wound fibre-reinforced polymer could be provided in various different arrangements including but not limited to: the circumferentially wound fibre-reinforced polymer being provided in a first layer and the helical wound fibre-reinforced polymer being provided in a second layer extending around the first layer; or the helical wound fibre-reinforced polymer being provided in a first layer and the circumferentially wound fibre-reinforced polymer being provided in a second layer extending around the first layer.

BRIEF DESCRIPTION OF THE DRAWINGS

Various non-limiting examples will now be described, by way of example only, and with reference to the accompanying drawings in which:

FIG. 1 shows a cross section through an electrical isolator above the centreline thereof according to a first example of the disclosure;

FIG. 2 shows a cross section through an electrical isolator above the centreline thereof according to a second example of the disclosure;

FIG. 5 shows a cross section through an electrical isolator above the centreline thereof according to a fifth example of the disclosure; and FIG. 6 shows a cross section through an electrical isolator above the centreline thereof according to a sixth example of the disclosure.

DETAILED DESCRIPTION

Figure 3:
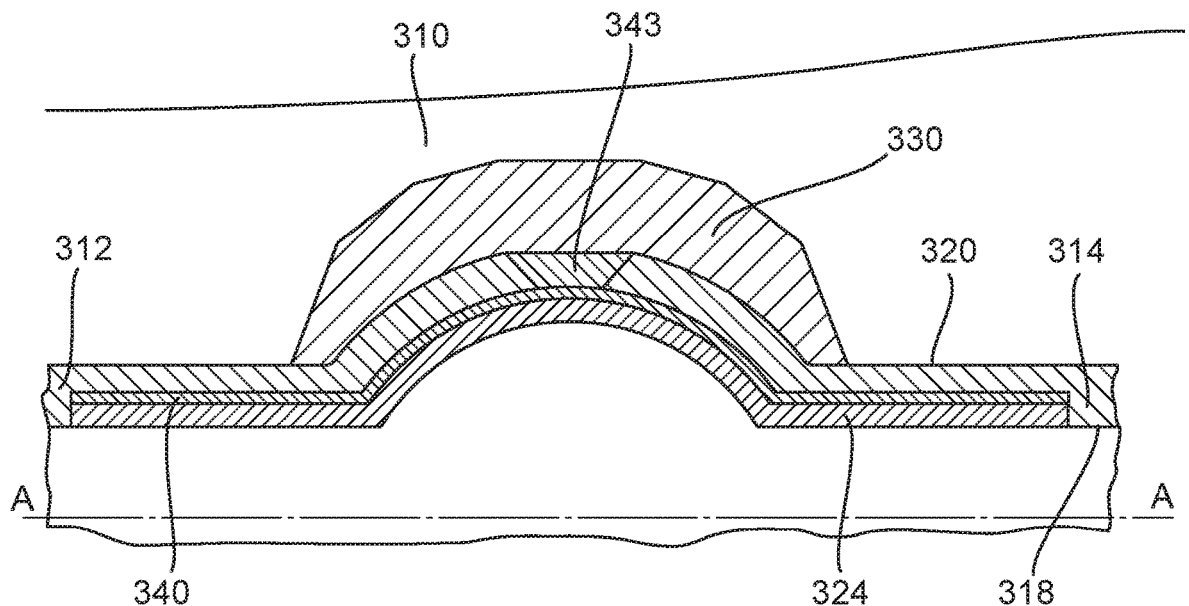
FIG. 3 shows a cross section through an electrical isolator above the centreline thereof according to a third example of the disclosure.

The present disclosure relates to electrical isolators, which may be used in aircraft hydraulic systems or hydraulic fluid lines in order to provide a strong fluid carrying structure whilst controlling induced electric current (e.g. by lightning) and dissipation of electrostatic charge. It will be understood that the drawings show cross sections through example electrical isolators above the centreline thereof. The cross sections through the example electrical isolators of the drawings below the centreline thereof (not shown) would be a mirror image of that shown above the centreline.

FIG. 1 shows an electrical isolator or fluid carrying element 10 according to an example of the present disclosure.

The electrical isolator 10 forms part of a fluid conveying network, such as a hydraulic fluid network in an aircraft. Fluid, for example hydraulic fluid, may flow through the electrical isolator 10 in the direction of arrow 100.

The electrical isolator 10 comprises a first fluid-carrying member or pipe 12 and a second fluid-carrying member or pipe 14. Both the first pipe 12 and the second pipe 14 may be metallic and may comprise end fittings for attachment to other tubular members in a fluid-carrying system. In the illustrated example the first pipe 12 and the second pipe 14 have the same structure. The first and second pipes 12, 14 are opposed and spaced apart from one another to provide a gap G there between.

In the illustrated example the first pipe 12 and second pipe 14 are tubular, i.e. cylindrical in shape and having a circular cross-section. Other shapes and cross-sections are possible. Whilst in FIG. 1 the first pipe 12 and second pipe 14 are shown as coaxial extending about an axis A-A, this is not essential and examples are envisaged in which the axes of the first pipe 12 and second pipe 14 are at an angle with respect to each other. The angle may be less than 90, 60, 30, 15, 10 or 5 degrees, for example.

The first pipe 12 and the second pipe 14 comprise a radially inner axial surface 18 and a radially outer axial surface 20 spaced therefrom in a radial direction to form a wall thickness of the first and second pipes 12, 14. Both the first pipe 12 and the second pipe 14 terminate in a flange 16 extending radially away from the axis A-A and beyond the radially outer axial surface 20. Thus, the flanges 16 provide a radial surface 26 as the end face of the first and second pipes 12, 14.

A cut-out portion is formed in the radially inner axial surface 18 of the first pipe 12 and the second pipe 14 extending from the open end thereof and away from the opposing pipe and extending around the circumference of the pipe so as to form a substantially annular cut-out portion. A radial surface 22 defines the end of the cut-out portion and joins with the radially inner axial surface 18.

An annular liner 24 formed from a resistive, semi-conductive or non-conductive material is provided to fit within the cut-out portions in the first and second pipes 12, 14 so that a radially inner surface 25 of the annular liner 24 extends substantially flush with the radially inner axial surface 18 of the first and second pipes 12, 14. It will be appreciated that the annular liner 24 extends between the first and second pipes 12, 14 to maintain the gap G there between. The size of the gap G between the first and second pipes 12, 14 is determined to provide electrical isolation between the first and second pipes 12, 14. In one example, the size of the gap G may be defined by the expected static and electrical requirements of an isolator. In one preferred example, the gap G between the first and second metallic pipes 12, 14 should be at least 3 mm.

A minimum gap between the first and second pipes at the wet surfaces thereof is also required. This may typically be provided by an axial length of the annular liner 24 extending between the wet surface of the respective first and second pipes 12, 14 and may be about 3.81 cm (1.5 inches). It will be appreciated however that the gap required will be dependent on the dimensions and intended use of a particular isolator and may be defined by the expected static and electrical requirements thereof. Thus, in an alternative example of the disclosure, the minimum gap between the first and second pipes at the wet surfaces thereof may be about 1.27 cm to about 2.54 cm (about 0.5 inches to about 1 inch).

In the example shown in FIG. 1, the minimum gap between the first and second pipes at the wet surfaces thereof is defined by the axial length of the annular liner 24. It will therefore be appreciated that the electrical isolator of the example may be made significantly shorter in an axial direction than has been possible in the past as the moulded fluoro elastomer seal and a reinforcing composite 30 can be provided to extend over less than the axial extent of the annular liner 24. Further the electrical isolator of the example may have a reduced weight and be less expensive and time consuming to produce than previously known electrical isolators.

A material (for example, a fluoro elastomer 28) is moulded to fill the gap G between the flanges 16 of the first and second pipes 12,14. Many rigid or flexible materials could be provided in place of the fluoro elastomer if the material provides appropriate electrical isolation properties and if the material does not react with a fluid medium flowing through the isolator. In one example, a material similar to Dow Corning® 730 FS Solvent Resistant Sealant Arc Resistance=124 can be used. Moulded materials like PEEK or Nitrile may be used when chemically compatible with the other materials used in the isolator. In another preferred example, PR-1770 Class A Fuel Tank Sealant may be used.

When in situ, the material or fluoro elastomer 28 forms an annular shape and is bonded to the radially outer surface of the annular liner 24 and the radial surfaces 26 defined by the respective flanges 16 of the first and second pipes 12, 14. It will be understood that the moulded fluoro elastomer acts to hold together the first and second pipes 12, 14 and to hold the annular liner 24 to the first and second pipes 12, 14.

Thus, the moulded fluoro elastomer 28 provides a fluid tight seal between the annular liner 24 and the first and second pipes 12, 14.

The moulded fluoro elastomer typically also has a hardness and rigidity appropriate to minimise movement and the radial or hoop stresses experienced between the first pipe 12, the second pipe 14 and the annular liner 24.

In accordance with the present disclosure, a reinforcing composite 30 is located around the first pipe 12, the second pipe 14 and the fluoro elastomer 28. The reinforcing composite 30 may consist of, or consist essentially of the fibre and resin mixture. The fibre may be glass fibre, carbon fibre or aramid fibre. The resin mixture may comprise a resin that may be of thermoset (e.g. epoxy) or thermoplastic (e.g. polyether ether ketone—"PEEK") construction.

The reinforcing composite 30 may be continuous and cover all of the first pipe 12, second pipe 14 and fluoro elastomer 28 with no air gap and/or other material in between. The first pipe 12 and second pipe 14 may comprise a surface coating or treatment, and the surface coating or treatment may be the only material between the first pipe 12 or second pipe 14 and the reinforcing composite 30.

The reinforcing composite 30 extends axially past the flanges 16 of the first pipe 12 and the second pipe 14. As such, the internal diameter of the reinforcing composite 30 gradually decreases as the reinforcing composite 30 extends over and beyond the flanges 16 to provide a domed outer profile which may be optimised for internal pressures experienced by the isolator. In some examples, an isolator may have an outer profile comprising a parallel centre section radially outward of the gap G, the outer profile tapering away at either end thereof.

The resin mixture comprises a conductive additive, for example carbon black and/or carbon nanotubes, and this can be incorporated into the resin mixture in varying amounts to achieve the desired conductivity for a particular application.

The reinforcing composite allows the electrical isolator to withstand the high internal pressures to which it will be subjected when used in a hydraulic system without leaking. To achieve the best resistance to both the radial and axial forces exerted on the electrical isolator, the reinforcing composite may comprise fibres wound circumferentially around the pipes and the fluoro elastomer (for the radial forces) and fibres wound helically around the pipes and the fluoro elastomer (for the axial forces and some radial force). In one example of the disclosure, the reinforcing composite comprises a layer or a plurality of layers of circumferentially wound fibre-reinforced polymer extending circumferentially around the first fluid-carrying member, the second fluid-carrying member and the resistive, semi-conductive or non-conductive component and a layer or a plurality of layers of helical wound fibre-reinforced polymer extending helically around the layer of circumferentially wound fibre-reinforced polymer, the first fluid-carrying member, the second fluid-carrying member and the resistive, semi-conductive or non-conductive component.

The layers of circumferentially wound fibre (also referred to as "hoop" fibre) provide additional pressure resistance to the electrical isolator. Hoop fibre is wound with a high angle to the axis of the structure such that it is wound in a very tight helix (or in some cases, even wound directly over itself, i.e. at ninety degrees to the axis). As such, hoop fibre cannot expand under radial pressure and is therefore strong against radial loads, i.e. it is pressure resistant. Such an electrical isolator with a layer of hoop fibre is better adapted to the high pressures of hydraulic systems.

While circumferential fibre is well-suited to providing pressure resistance, it is not well-suited to holding the electrical isolator together as it does not provide much strength in the axial direction. However, the layer of helical wound fibre does provide axial strength.

Circumferential fibre here means fibre with a high winding angle (the angle that the fibre makes with the axis of the part (usually mounted on a mandrel) during winding), typically from 80 degrees up to 90 degrees, more preferably at least 85 degrees.

Helical fibre here means fibre with a low winding angle, typically between 30 degrees and 70 degrees. It is often difficult to wind fibre at angles below about 30 degrees, while angles above 70 degrees do not provide the required axial strength. Lower angles are however still viable, down to essentially 0 degrees if fibre placement can be achieved. Even true axial fibre can be used instead of helical fibre (i.e. fibre with an angle of 0 degrees to the axis, i.e. parallel to the axis), but placement of such fibre is difficult.

A method of forming the electrical isolator of FIG. 1 will now be described.

The first pipe 12 and the second pipe 14 may be provided. The first pipe 12 and/or second pipe 14 may form part of a pipe network, or each comprise the end portion of a larger pipe. The electrical isolator 10 may be part of a hydraulic pipe network operating at greater than 1000, 2000 or 3000 psi, for example a hydraulic system or hydraulic fluid pipe in an aircraft.

The annular liner is inserted into the cut-out portions of the first and second pipes 12, 14 so as to extend along and between the first and second pipes 12, 14 and to provide a gap G between the first and second pipes 12, 14. A fluoro elastomer 28 is then moulded into the gap G between the flanges 16 of the first and second pipes 12,14. Thus, when in situ, the fluoro elastomer 28 forms an annular shape and is bonded to the radially outer surface 27 of the annular liner 24 and the radial surfaces 26 defined by the respective flanges 16 of the first and second pipes 12, 14. In one preferred example, the fluoro elastomer is injection moulded and adhesive is applied to the radially outer surface 27 of the annular liner 24 and the radial surfaces 26 defined by the respective flanges 16 of the first and second pipes 12, 14 to bond the fluoro elastomer thereto.

In order to provide a reinforcement, a reinforcing composite 30 is located around the first pipe 12, the second pipe 14, the annular liner 24 and the fluoro elastomer 28.

To form the composite 30, a fibre (e.g. a polymer fibre) may be drawn through a bath containing the resin mixture, and then the fibre and resin mixture may be wound around the first pipe 12, the second pipe 14, the annular liner 24 and the fluoro elastomer 28 until the fibre and resin mixture exhibits a sufficient thickness and covers the required axial extent of the first pipe 12, the fluoro elastomer 28 and the second pipe 14. The orientation of the fibres may be controlled, for example using an automated layup method. The resin mixture comprises a conductive additive. This can be added and mixed into the resin contained in the bath in varying amounts, to alter or change the conductivity of the reinforcing composite 30.

The composite 30 may also be formed using a fibre material that has been impregnated with a resin, rather than drawing the fibre through a resin bath as described above.

The fibre and resin mixture is cured to form the reinforcing composite 30. Once cured, the reinforcing composite acts to hold the components of the electrical insulator 10 together to provide strength and resistance when high pressure fluids are passed through the electrical isolator 10.

The method may further comprise passing fluid through the electrical isolator 10, i.e. from the first pipe 12 to the second pipe 14 via the annular liner 24, at a pressure of greater than 1000, 2000 or 3000 psi. The method may further comprise passing fluid through the electrical isolator 10, i.e. from the first pipe 12 to the second pipe 14 via the annular liner 24, at a test pressure of 30,000 psi or more.

FIG. 2 shows an electrical isolator or fluid carrying element 210 according to an alternative example of the present disclosure in which the shape thereof has been altered to reduce internal stresses in the components of the electrical isolator and the weight thereof.

In the illustrated example the first pipe 212 and second pipe 214 are tubular, i.e. cylindrical in shape and having a circular cross-section.

The first pipe 212 and the second pipe 214 comprise a radially inner axial surface 218 and a radially outer axial surface 220 spaced therefrom in a radial direction to form a wall thickness of the first and second pipes 212, 214. Both the first pipe 212 and the second pipe 214 comprise an end portion 234 which forms a curved shape in cross section, extending radially outwardly away from the axis A-A along which the first and second pipes 212, 214 extend. When assembled so that the first pipe 212 opposes the second pipe 214 with the gap G there between, the curved end portions 234 of the first and second pipes 212, 214 form an arc in cross section as seen in FIG. 2. Thus, the end portions of the first annular pipe 212 and the second annular pipe 214 extend towards each other and form a substantially ovoid shape or a bulge extending radially outwardly from the first and second annular pipes 212, 214.

A cut-out portion is formed in the radially inner axial surface 218 of the first pipe 212 and the second pipe 214 extending from the open ends thereof and away from the opposing pipe. A radial surface 222 defines the end of the cut-out portion in each of the first and second pipes 212, 214 and joins with the radially inner axial surface 218.

An annular liner 224 formed from a resistive, semi-conductive or non-conductive material is provided to fit within the cut-out portions in the first and second pipes 212, 214 and to extend between the first and second pipes 212, 214 to maintain the gap G there between. As seen in FIG. 2, the annular liner 224 of this example is shaped to conform with the curved shape of the end portions of the first and second pipes 212, 214. In one preferred example, the gap G between the first and second pipes 212, 214 should be at least 3 mm.

A fluoro elastomer 228 is moulded to fill the gap G between the opposing end faces 236 of the first and second pipes 212, 214. Thus, when in situ, the fluoro elastomer 228 forms an annular shape and is bonded to the radially outer surface of the annular liner 224 and the end faces 236 of the first and second pipes 212, 214. It will be understood that the moulded fluoro elastomer acts to hold together the first and second pipes 212, 214 and to hold the annular liner 224 to the first and second pipes 212, 214. Thus, the moulded fluoro elastomer 228 provides a fluid tight seal between the annular liner 224 and the first and second pipes 212, 214. The moulded fluoro elastomer typically has a hardness and rigidity appropriate to minimise movement and hoop stresses experienced between the first pipe 212, the second pipe 214 and the annular liner 224. In one non-limiting example the moulded fluoro elastomer may comprise Dow Corning 730 Solvent Resistant Sealant White 90 ml Tube. This material cures to a tough, flexible rubber, has good adhesion to many substrates, is stable and flexible from −65° C. (−85° F.) to 260° C. (500° F.). It retains its properties under exposure to fuels, oils and solvents. The material properties are as follows:

Durometer/Hardness: 40 A
Flash Point: >214 F
Rt Tack Free Time: 25 min
Base Chemistry: Fluorosilicone
Dielectric Strength: 331 volts/mil
Elongation: 200%
Peel Strength: 15
Service Temperature: −65 to 260 C
Tensile Strength: 300
Volume Resistance: 2.1×10(13) ohm-cm Durometer/Hardness: 40 A
Flash Point: >214 F
Rt Tack Free Time: 25 min
Base Chemistry: Fluorosilicone
Dielectric Strength: 331 volts/mil
Elongation: 200%
Peel Strength: 15
Service Temperature: −65 to 260 C
Tensile Strength: 300
Volume Resistance: 2.1×10(13) ohm-cm In an alternative example, DAIKIN's DAI-EL fluoro elastomer or Greene Tweed FPH Seal material may be used.

In accordance with the present disclosure, a reinforcing composite 230 is located around the first pipe 212, the second pipe 214 and the fluoro elastomer 228 in a manner similar to that described in relation to FIG. 1.

The reinforcing composite 230 extends axially past the bulge formed by the first pipe 212 and the second pipe 214 so as to meet the radially outer axial surface 220 of the first pipe 212 and the radially outer axial surface 220 of the second pipe 214. As such, the internal diameter of the reinforcing composite 230 gradually decreases as the reinforcing composite 230 extends over and beyond the bulge.

As seen in FIG. 2, the radially outer surface 238 of the fluoro elastomer 228 may be concave due to natural shrinkage of the fluoro elastomer away from the surfaces against which it is bonded during the production process. The concave surface 238 of the fluoro elastomer 228 may reduce the accuracy with which reinforcing fibres may be wound around the pipes and the fluoro elastomer when forming the reinforcing composite 230. To allow for this, the radially outer surface 238 of the fluoro elastomer 228 may be built up to provide a substantially flat surface.

It will be understood that the electrical isolator of FIG. 2 may be formed by the method described above in relation to FIG. 1.

FIG. 3 shows an electrical isolator or fluid carrying element 310 according to an alternative example of the present disclosure in which the shape thereof has been altered to reduce internal stresses in the components of the electrical isolator and the weight thereof in a manner similar to the example of FIG. 2.

In the illustrated example the first pipe 312 and second pipe 314 are tubular, i.e. cylindrical in shape and having a circular cross-section.

The first pipe 312 and the second pipe 314 comprise a radially inner axial surface 318 and a radially outer axial surface 320 spaced therefrom in a radial direction to form a wall thickness of the first and second pipes 312, 314. Both the first pipe 312 and the second pipe 314 comprise an end portion 334 shaped in a similar manner as in the example of FIG. 2. In contrast to the example of FIG. 2 however, the end faces 336 of the first and second pipes 312, 314 are angled, extending inwardly towards one another as they approach the radially inner surface of the respective first and second pipes 312, 314.

A cut-out portion is again formed in the radially inner axial surface 318 of the first pipe 312 and the second pipe 314.

An annular liner 324 formed from a resistive, semi-conductive or non-conductive material is provided to fit within the cut-out portions in the first and second pipes 312, 314 as in the example of FIG. 2.

As seen in FIG. 3, the seal between the first pipe 312, the annular liner 324 and the second pipe 314 is formed by bonding the radially outer surface 340 of the annular liner 324 to the radially inner surface 342 of the cut-out portions in the first and second pipes 312, 314. In one example, the annular liner may be coated with a film of adhesive then over wound with composite such that the adhesive bonds to the liner and the composite during curing.

A low conductivity glass composite material 343 is formed in the gap between the end faces 336 of the first and second pipes 312 and the radially inner surface of the low conductivity glass composite material 343 is bonded to the radially outer surface 340 of the annular liner 324. In one example, the glass fibres may be wound around the annular liner 324 in the gap so as to form a first few layers of hoop glass fibre in non-conductive (low carbon) resin. The fibres can then be overwound with conductive glass fibre and then the fibres and resin may be cured. If necessary to avoid carbon resin bleed, a partial cure may be carried out for the first few layers of hoop glass fibre in non-conductive (low carbon) resin, before over winding and then providing a final cure.

A reinforcing composite 330 is again located around the first pipe 312, the second pipe 314 and the low conductivity glass composite material 343 in a manner similar to that described in relation to FIG. 2.

A method of forming the electrical isolator of FIG. 3 will now be described.

The first pipe 312 and the second pipe 314 may be provided. The first pipe 312 and/or second pipe 314 may form part of a pipe network, or each comprise the end portion of a larger pipe. The electrical isolator 310 may be part of a hydraulic pipe network operating at greater than 1000, 2000 or 3000 psi, for example a hydraulic system or hydraulic fluid pipe in an aircraft.

A bonding material such as an adhesive, sealant material or injection moulded elastomeric material is applied to the radially outer surface 340 of the annular liner 324 and the annular liner is then inserted into the cut-out portions of the first and second pipes 312, 314 so as to provide a gap between the first and second pipes 312, 314 and to form the seal between the first pipe 312, the annular liner 324 and the second pipe 314.

A glass composite material 343 is then formed in the gap G between the ends of the first and second pipes 312, 314.

In order to provide a reinforcement, a reinforcing composite 330 is located around the first pipe 312, the second pipe 314, the annular liner 324 and the glass composite material 343 in the manner described in relation to FIG. 1.

The method may further comprise passing fluid through the electrical isolator 310, i.e. from the first pipe 312 to the second pipe 314 via the annular liner 324, at a pressure of greater than 1000, 2000 or 3000 psi.

Figure 4:
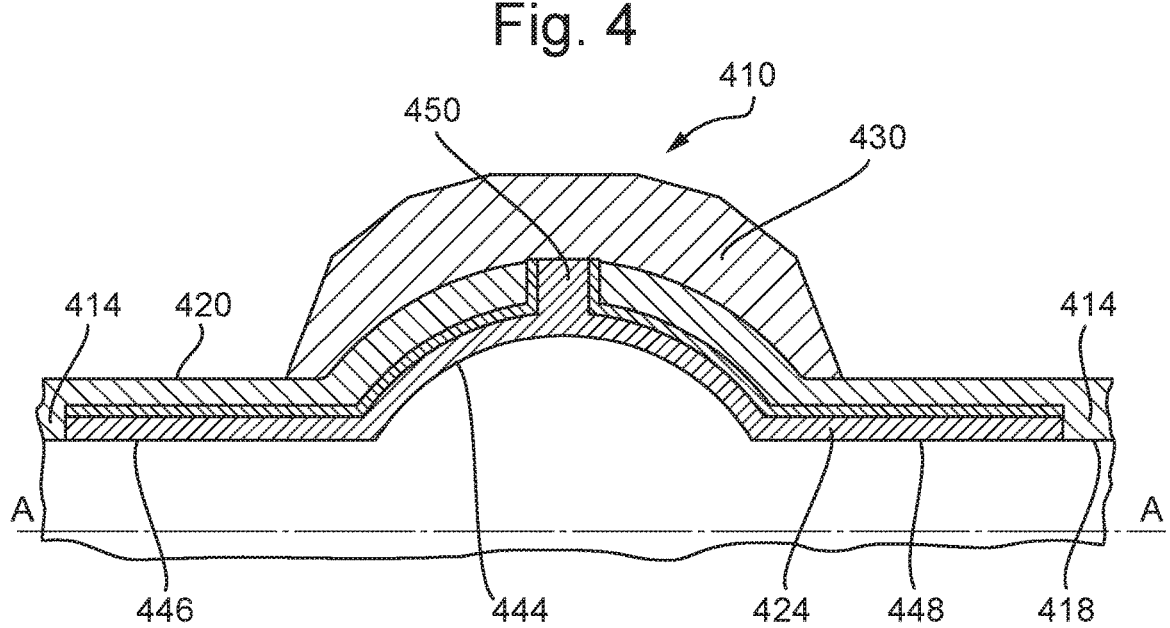
FIG. 4 shows a cross section through an electrical isolator above the centreline thereof according to a fourth example of the disclosure.

FIG. 4 shows an electrical isolator or fluid carrying element 410 according to an alternative example of the present disclosure in which the shape thereof has been altered to reduce internal stresses in the components of the electrical isolator and the weight thereof in a manner similar to the examples of FIGS. 2 and 3.

In the illustrated example the first pipe 412 and second pipe 414 are tubular, i.e. cylindrical in shape and having a circular cross-section.

The first pipe 412 and the second pipe 414 comprise a radially inner axial surface 418 and a radially outer axial surface 420 spaced therefrom in a radial direction to form a wall thickness of the first and second pipes 412, 414. Both the first pipe 412 and the second pipe 414 comprise an end portion 434 shaped in a similar manner as in the example of FIG. 2.

A cut-out portion is again formed in the radially inner axial surface 418 of the first pipe 412 and the second pipe 414.

An annular liner 424 formed from a resistive, semi-conductive or non-conductive material is provided to fit within the cut-out portions in the first and second pipes 412, 414 as in the example of FIG. 2. In the example shown in FIG. 4, the axially central part of the annular liner 434 forms an arc in cross section so as to form an ovoid shape or bulge portion 444 extending radially outwardly from a first cylindrical portion 446 provided at one end of the annular liner 434. A second cylindrical portion 448 is provided adjacent the bulge portion 444 at the other end of the annular liner 424. The annular liner 424 further comprises a radial protrusion 450 extending radially outwardly from the radially outermost part of the bulge portion 444. The radial protrusion 450 is shaped so as to fill the gap between the end portions 434 of the first and second pipes 412, 414. Thus, in this example, the radial protrusion 450 provides the required isolation between the first and second pipes 412, 414.

As seen in FIG. 4, the seal between the first pipe 412, the annular liner 424 and the second pipe 414 is formed by bonding the radially outer surface 440 of the annular liner 424 to the radially inner surface 442 of the cut-out portions in the first and second pipes 412, 414. PR-1770 Class A Fuel Tank Sealant or similar may be used. The end faces 436 of the first and second pipes are also bonded to the corresponding surfaces of the radial protrusion 450.

A reinforcing composite 430 is again located around the first pipe 412, the second pipe 414 and the annular liner 424 in a manner similar to that described in relation to FIG. 2.

A method of forming the electrical isolator of FIG. 4 will now be described.

The first pipe 412 and the second pipe 414 may be provided. The first pipe 412 and/or second pipe 414 may form part of a pipe network, or each comprise the end portion of a larger pipe. The electrical isolator 410 may be part of a hydraulic pipe network operating at greater than 1000, 2000 or 3000 psi, for example a hydraulic system or hydraulic fluid pipe in an aircraft.

A bonding material such as an adhesive, sealant material or injection moulded elastomeric material is applied to the radially outer surface 440 of the annular liner 424 and the side surfaces of the radial protrusion 450. The annular liner 424 is then inserted into the cut-out portions of the first and second pipes 412, 414 so as to provide a gap (filled by the radial protrusion 450) between the first and second pipes 412, 414 and to form the seal between the first pipe 412, the annular liner 424 and the second pipe 414.

In order to provide a reinforcement, a reinforcing composite 430 is located around the first pipe 412, the second pipe 414 and the annular liner 424 in the manner described in relation to FIG. 1.

The method may further comprise passing fluid through the electrical isolator 410, i.e. from the first pipe 412 to the second pipe 414 via the annular liner 424, at a pressure of greater than 1000, 2000 or 3000 psi.

FIG. 5 shows an electrical isolator or fluid carrying element 510 according to an alternative example of the present disclosure. The electrical isolator 510 of FIG. 5 is intended for use in lower pressure environments. Aerospace, automotive, industrial and domestic applications may use an isolator that is subjected to much lower pressures. In some applications fuel pressures may be less than 125 psi, with approximately 45 psi being typical in some automotive applications.

The electrical isolator 510 comprises a first fluid-carrying member or pipe 512 and a second fluid-carrying member or pipe 514 as in the previous examples. The first and second pipes 512, 514 are cylindrical in shape and are opposed and spaced apart from one another along an axis A-A to provide a gap G there between.

The first pipe 512 and the second pipe 514 comprise a radially inner axial surface 518 and a radially outer axial surface 520 spaced therefrom in a radial direction to form a wall thickness of the first and second pipes 512, 514. Both the first pipe 512 and the second pipe 514 terminate at a tapered end face 552.

An annular liner 524 formed from a resistive, semi-conductive or non-conductive material is provided to extend over part of the first pipe 512, across the gap G and over part of the second pipe 514. The seal between the first pipe 512, the annular liner 524 and the second pipe 514 is formed by bonding the radially inner surface 554 of the annular liner 524 to the radially outer surface 520 of the first and second pipes 512, 514.

In accordance with the present disclosure, a reinforcing composite 530 is located around the first pipe 512, the second pipe 514 and the annular liner 524 in a similar manner to that previously described.

The reinforcing composite 530 extends axially past the ends of the annular liner 524 and joins with the first pipe 512 and the second pipe 514. As such, the internal diameter of the reinforcing composite 530 gradually decreases as the reinforcing composite 530 extends over and beyond the ends of the annular liner 524.

A method of forming the electrical isolator of FIG. 5 will now be described.

The first pipe 512 and the second pipe 514 may be provided. The first pipe 512 and/or second pipe 514 may form part of a pipe network, or each comprise the end portion of a larger pipe.

A bonding material such as an adhesive, sealant material or injection moulded elastomeric material is applied to the radially inner surface 554 of the annular liner 524. The radially inner surface 554 of the annular liner 524 is then positioned in mating engagement with the radially outer surfaces of the first and second pipes 512, 514 so as to provide a gap between the first and second pipes 512, 514 and to form the seal between the first pipe 512, the annular liner 524 and the second pipe 514.

The method may further comprise passing fluid through the electrical isolator 510, i.e. from the first pipe 512 to the second pipe 514 via the annular liner 524, at a pressure of between about 30 and 150 psi.

In an alternative example as shown in FIG. 6, a long annular liner tube 624 may be overwound with a simple wound composite having a substantially constant radius over the longitudinal extent thereof to form an outer surface 690 extending substantially parallel to the liner tuber 624. The simple wound composite forms the reinforcing composite 630 and then the tube may be cut to a required length as necessary. This further simplifies production of the electrical isolator according to the example and provides a low cost solution for lower pressures which is non-weight optimised with square corners.

To provide the necessary functionality of the electrical isolator, the radially outer layer of the reinforcing composite 630 may be conductive while the radially inner part of the reinforcing composite is not conductive. A cup shaped metal contact (not shown) may then be provided extending from each of the first and second pipes 612, 614 to contact the conductive radially outer layer of the reinforcing composite 630.

Although the present disclosure has been described with reference to various examples, it will be understood by those skilled in the art that various changes in form and detail may be made without departing from the scope of the disclosure as set forth in the accompanying claims.

The invention claimed is:

1. An electrical isolator comprising:
a first fluid-carrying member;
a second fluid-carrying member spaced apart from the first fluid-carrying member to form a gap;
a resistive, semi-conductive or non-conductive annular liner,
wherein the annular liner extends coaxially with the first and second fluid-carrying members,
wherein the annular liner extends across the gap,
wherein a radially outer surface of the annular liner is bonded to respective radially inner surfaces of the first and second fluid-carrying members so as to provide a fluid tight seal between the first fluid-carrying member and the annular liner and between the second fluid-carrying member and the annular liner; and
a reinforcing composite encircling the first fluid-carrying member, the second fluid-carrying member and the annular liner.

2. An electrical isolator as claimed in claim 1, wherein a material is provided in the gap between the first and second fluid-carrying members and is bonded to the annular liner, and the first and second fluid-carrying members.

3. An electrical isolator as claimed in claim 2, wherein the first fluid-carrying member terminates in a first flange extending radially outwardly therefrom, and the second fluid-carrying member terminates in a second flange extending radially outwardly therefrom and the material extends between the first flange and the second flange.

4. An electrical isolator as claimed in claim 1, wherein the annular liner is bonded to the first and second fluid-carrying members by a bonding material provided between the annular liner and the first fluid-carrying member and between the annular liner and the second fluid-carrying member.

5. An electrical isolator as claimed in claim 4, wherein a first cut-out portion is formed in the first fluid-carrying member,
a second cut-out portion is formed in the second fluid-carrying member, and
the annular liner is received in the first and second cut-out portions so that the radially inner surface of the annular liner is substantially flush with the radially inner surface of the first fluid-carrying member and the second fluid-carrying member.

6. An electrical isolator as claimed in claim 1, wherein the reinforcing composite comprises:
a layer of circumferentially wound fibre-reinforced polymer extending circumferentially around the first fluid-carrying member, the second fluid-carrying member and the annular liner; and a layer of helical wound fibre-reinforced polymer extending helically around the first fluid-carrying member, the second fluid-carrying member and the annular liner.

7. An electrical isolator as claimed in claim 1, wherein each of the first fluid-carrying member and the second fluid-carrying member comprise a curved portion, such that the curved portions of the first and second fluid carrying members form a substantially ovoid shape or a bulge extending radially outwardly from the first and second fluid carrying members.

8. An electrical isolator as claimed in claim 7, wherein the gap is located at the radially outermost portion of the ovoid shape or bulge.

9. An electrical isolator as claimed in claim 7, wherein the annular liner is shaped so as to follow the shape of the first and second fluid-carrying members.

10. An electrical isolator as claimed in claim 9, wherein the annular liner further comprises a radial protrusion extending radially outwardly therefrom into the gap.

11. An electrical isolator as claimed in claim 7, wherein a composite material having a low conductivity is provided in the gap extending between the first and second fluid-carrying members.

12. A hydraulic or fuel system comprising an electrical isolator as claimed in claim 1.

13. A method of making an electrical isolator, the method comprising:

bonding a radially inner surface of a first fluid-carrying member and a radially inner surface of a second fluid-carrying member to a radially outer surface of an annular liner extending across a gap between the first fluid-carrying member and the second fluid-carrying member so as to provide a fluid tight seal between the first fluid-carrying member and the annular liner and between the second fluid-carrying member and the annular liner, wherein the annular liner extends coaxially with the first and second fluid-carrying members; and forming a reinforcing composite encircling the first fluid-carrying member, the second fluid-carrying member and the annular liner.

14. A method as claimed in claim 13, wherein forming the reinforcing composite comprises:

winding fibre-reinforced polymer around the first fluid-carrying member, the second fluid-carrying member and the annular liner;

before during or after the winding fibre-reinforced polymer, providing a resin mixture so as to form a fibre-reinforced polymer and resin mixture extending around the first fluid-carrying member, the second fluid-carrying member and the annular liner; and curing the fibre-reinforced polymer and resin mixture.

* * * * *